INVENTOR.
PAUL E. BLOCK,
BY
ATTORNEYS.

INVENTOR.
PAUL E. BLOCK,
BY
Wolfe, Hubbard, Voit & Osann
ATTORNEYS.

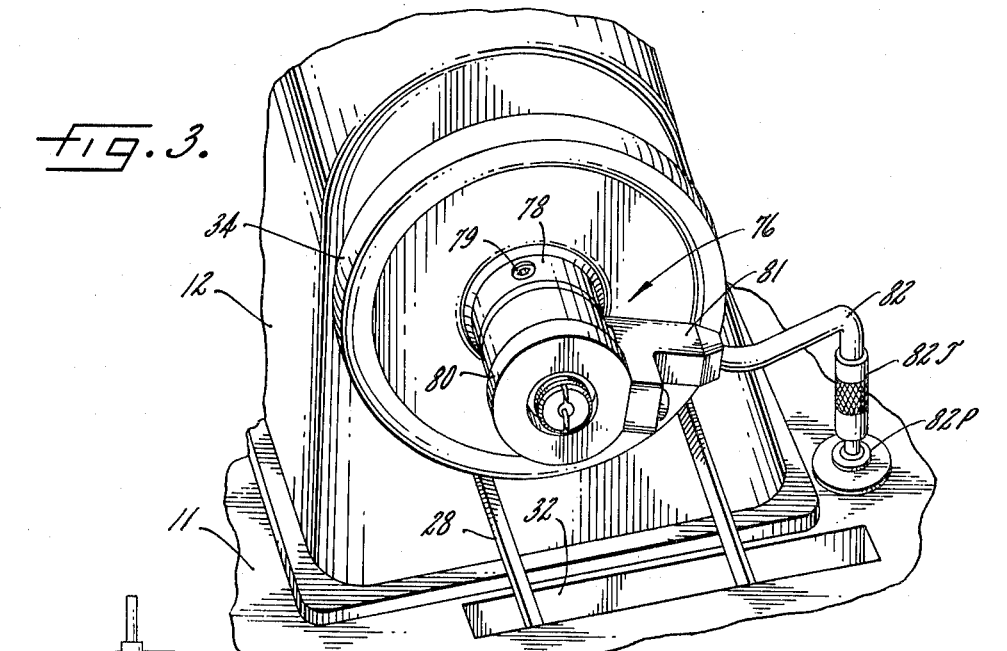
Fig. 3.
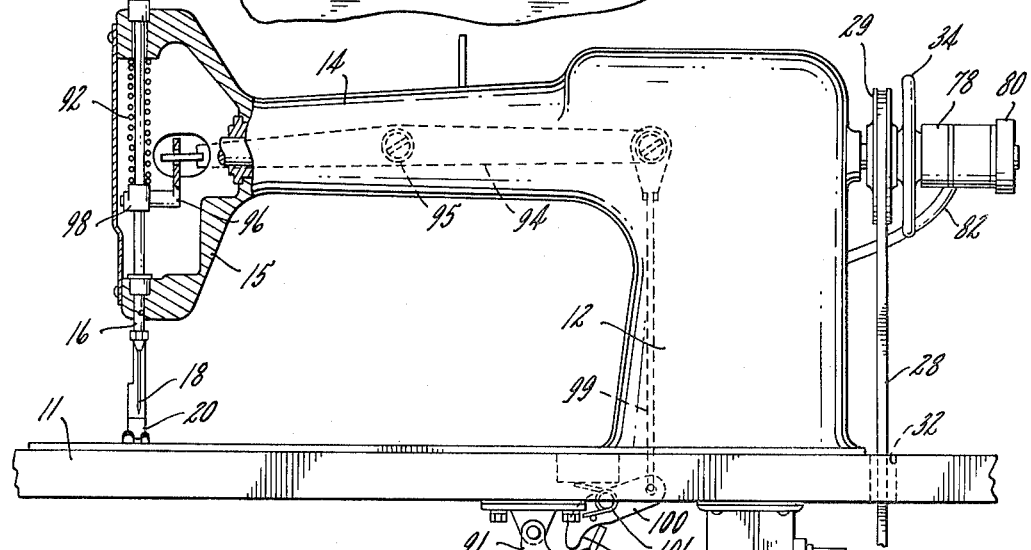
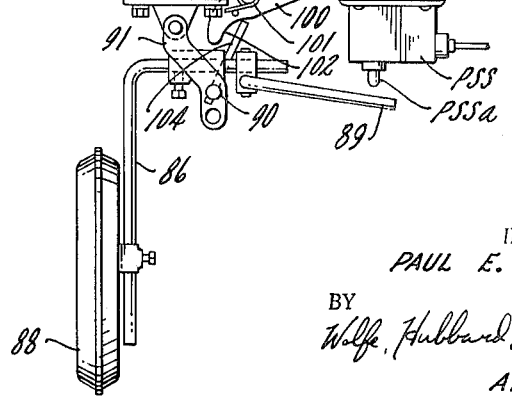
Fig. 5.
INVENTOR.
PAUL E. BLOCK,
BY
ATTORNEYS.

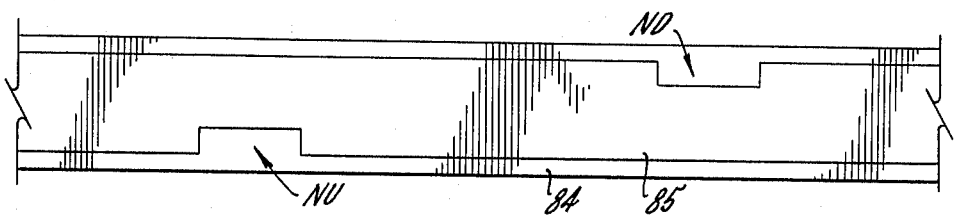
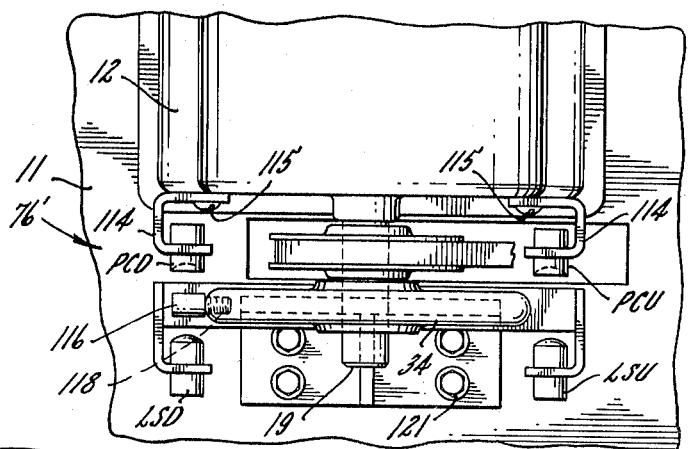
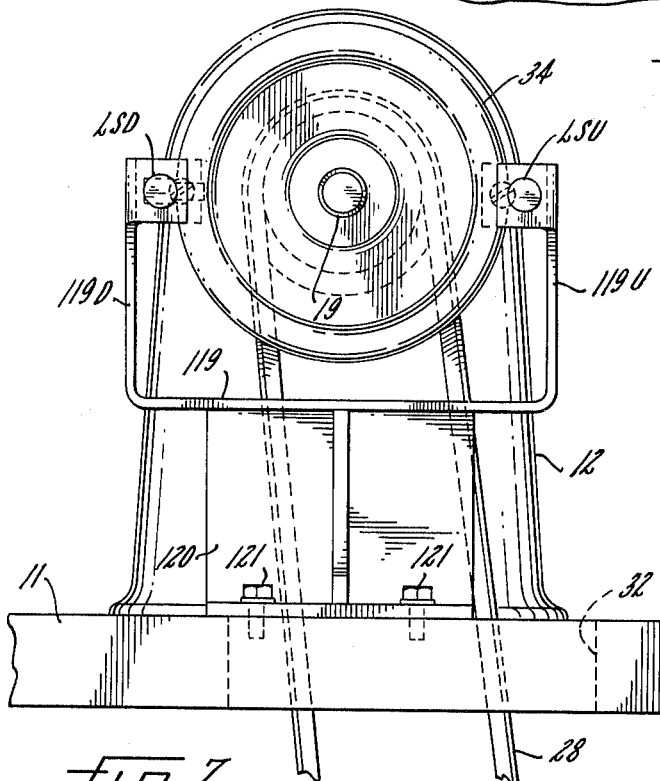

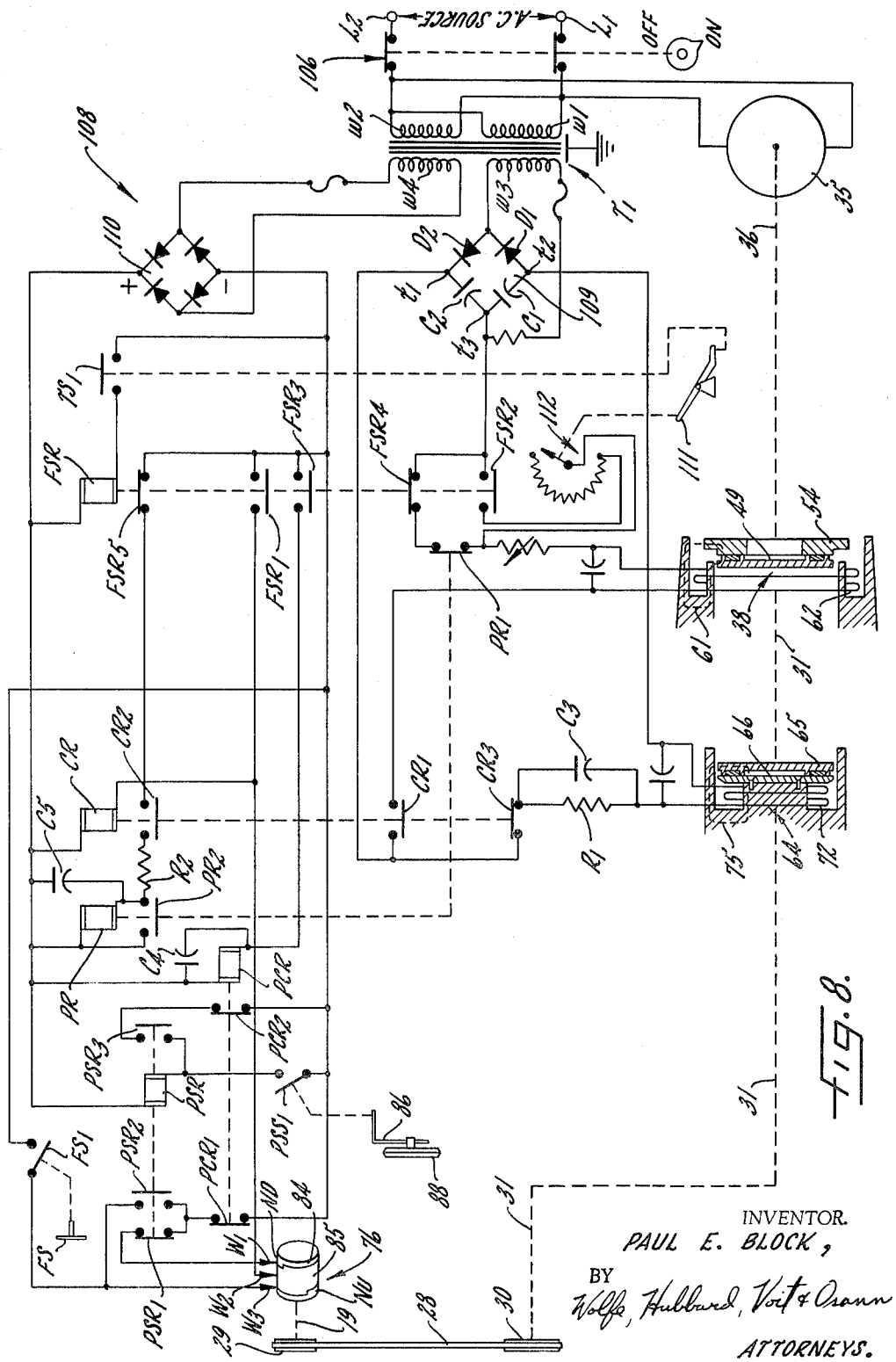

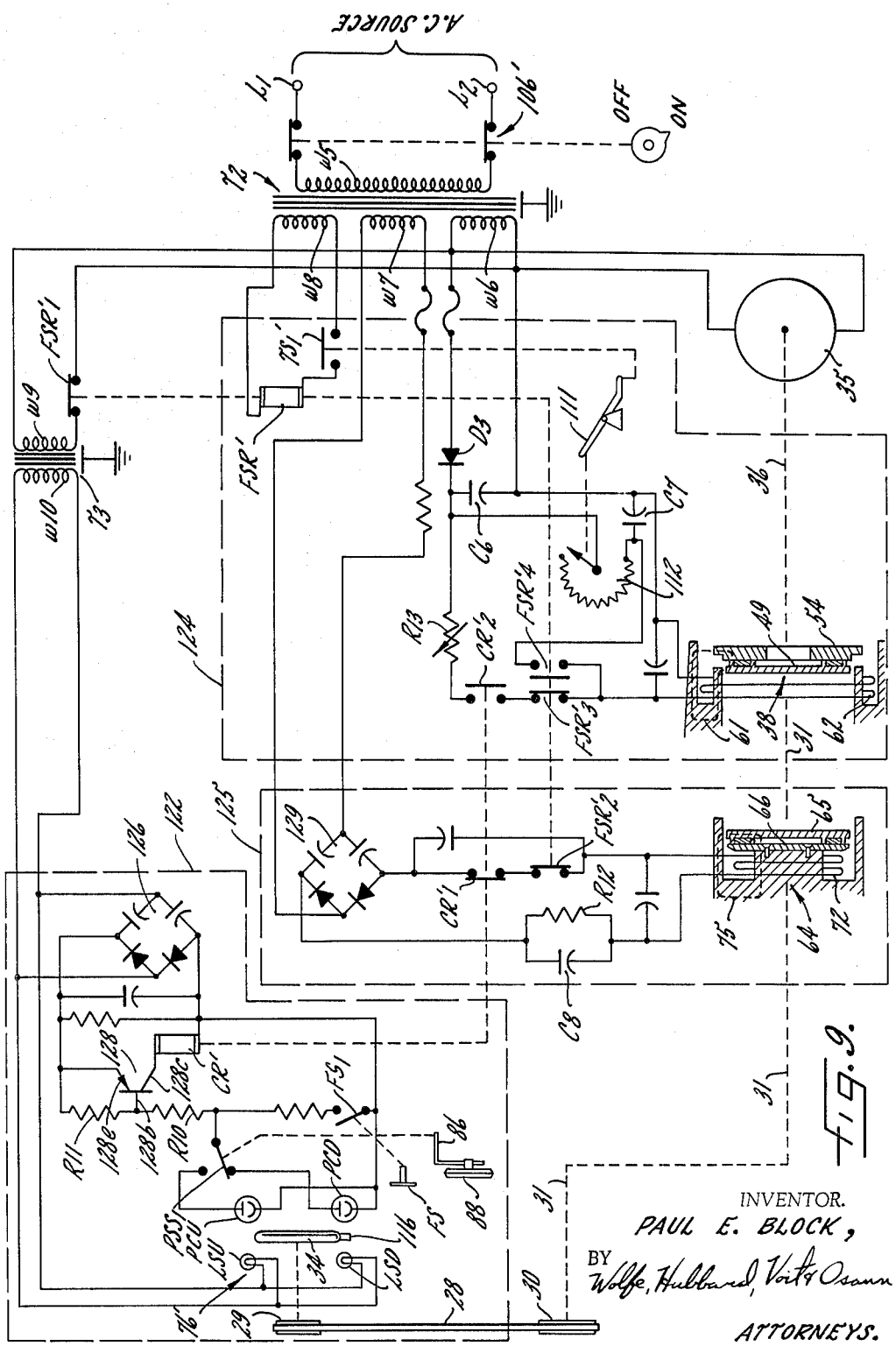

United States Patent Office 3,253,561
Patented May 31, 1966

3,253,561
POWER TRANSMISSION SYSTEM WITH CONTROLLED STOP POSITIONING
Paul E. Block, Beloit, Wis., assignor to Warner Electric Brake & Clutch Company, South Beloit, Ill., a corporation of Delaware
Filed Jan. 24, 1964, Ser. No. 340,081
4 Claims. (Cl. 112—219)

The present invention relates in general to a power transmission system for intermittently operated machines and, more particularly, to improved apparatus for controlling the stop or "dead" position of an intermittently driven element such as the needle of a sewing machine. In its principal aspects, the invention is concerned with apparatus for applying substantially full braking power to a moving machine needle irrespective of its speed or position so as to rapidly stop the same, and for then de-energizing the brake and pulsing a clutch so as to inch or step the needle ahead until the latter reaches a predetermined desired dead position, at which time the brake is again applied to stop the needle.

In the operation of sewing machines normally driven at relatively high rates of speed (e.g., on the order of up to or in excess of 8000 r.p.m.), there has been a perennial problem of providing effective, yet economically practical, ways for insuring that the tool or driven element is stopped as rapidly as possible in a predetermined position or in a selectable one of several predetermined positions. In the garment or textile industry, this problem manifests itself in providing equipment and methods for insuring that high-speed industrial-type sewing machines can be reliably stopped by the operator with the needle either penetrating the work (i.e., "needle down" position) or with the needle withdrawn from the work (i.e., "needle up" position). The former, or needle down position, is required when the operator wishes to turn or pivot the work about the engaged needle so as to permit continued sewing in a different direction. The latter, or needle up position, is required when the operator wishes to remove the work or to make necessary thread adjustments or the like.

The primary object of this invention is to provide a sewing machine drive which is simpler in construction, lower in cost, and more reliable in operation than prior drives by virtue of the use of an electromagnetic friction clutch which is used not only in the sewing operations but also in a unique way in automatically moving the needle to a predetermined position after termination of a sewing operation.

A more detailed object is to provide for automatic and intermittent energization of the main friction clutch to advance the needle step by step until it reaches the predetermined position.

Another object is to provide for manual selection of any one of a plurality of predetermined positions such as needle up and needle down.

Other objects and advantages of the invention will become apparent as the following description proceeds, taken in conjunction with the accompanying drawings, in which:

FIG. 3 is an enlarged perspective view illustrating mounting details of the rotary switch utilized for detecting needle position with the form of the invention shown in FIG. 1;

FIG. 4 is a developed view, on an enlarged scale, of the rotary switch employed with the examplary machine shown in FIG. 1 for providing a continuous indication of needle position, the switch here being provided with two barrier portions correlated with the needle up and needle down stop position;

FIG. 5 is a fragmentary front elevational view on a slightly enlarged scale of a portion of the exemplary sewing machine shown in FIG. 1 here illustrating details of the operator actuated, needle position selector and the mechanical linkage used for elevating the presser foot;

FIG. 6 is a fragmentary plan view of a modified construction for providing a continuous indication of needle position, the modified construction also embodying the features of the present invention;

FIG. 7 is a fragmentary side elevation of the modified construction shown in FIG. 6;

FIG. 8 is a schematic wiring diagram illustrating the electrical components used in an exemplary control circuit for the embodiment of the invention shown in FIGS. 1 through 5; and, FIG. 9 is a schematic wiring diagram similar to FIG. 8 and here depicting the electrical components used in an exemplary control circuit for the modified power operated sewing machine shown in FIGS. 6 and 7.

Figure 1:
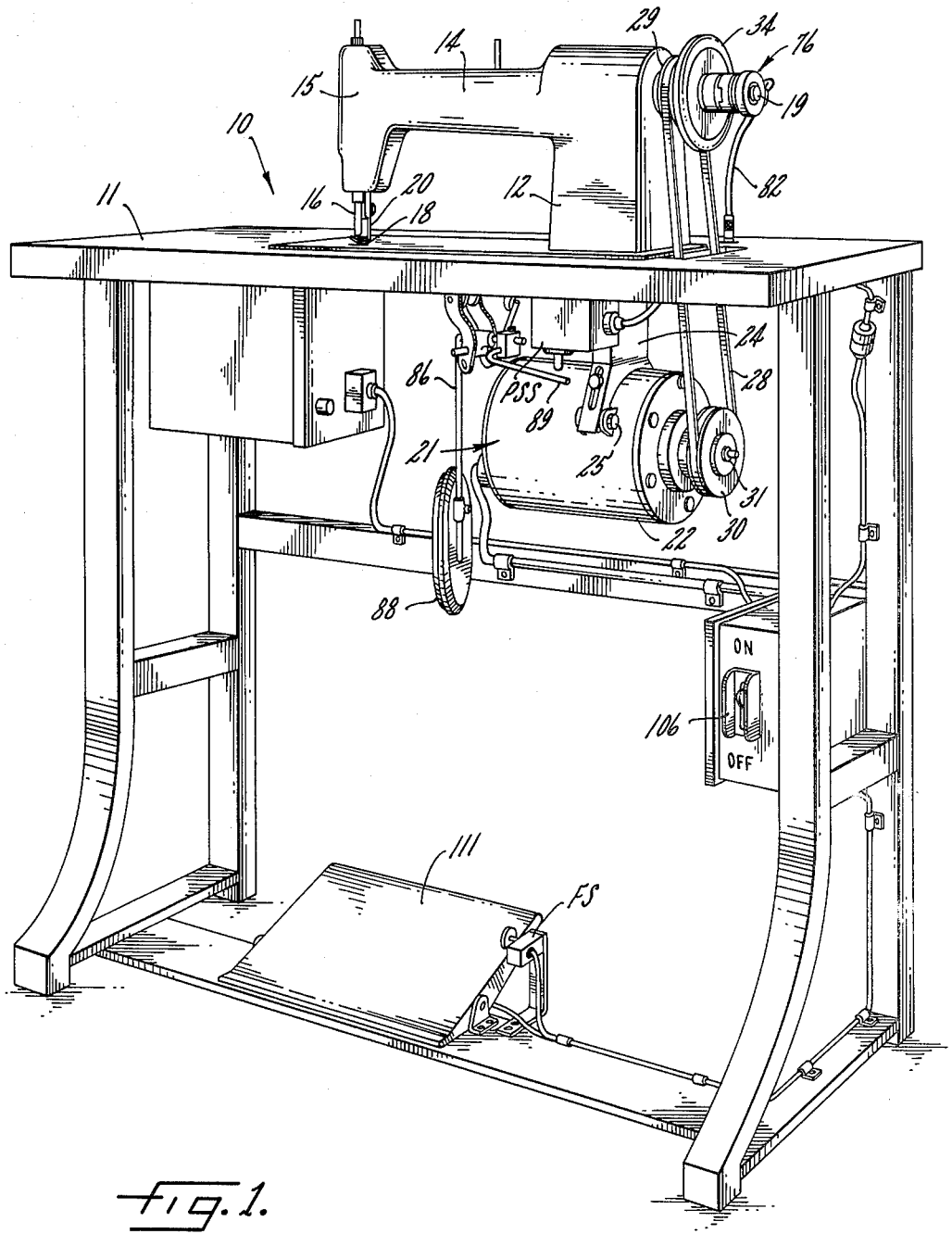
FIGURE 1 is a perspective view of an industrial-type sewing machine embodying the features of the present invention.

While the present invention is susceptible of various modifications and alternative forms, specific embodiments thereof have been shown by way of example in the drawings and will herein be described in detail. It should be understood, however, that it is not intended to limit the invention to the particular forms disclosed herein, but, on the contrary, the intention is to cover all modifications, equivalents and alternatives falling within the spirit and scope of the invention as expressed in the appended claims.

Referring now to the drawings, there is illustrated in FIG. 1 as exemplary power driven machine, generally indicated at 10, embodying the features of the present invention. As the description proceeds, it will become apparent that the present invention will find use in a wide variety of environments or industrial applications such, for example, as in the positive stop positioning of the tool or rotatably driven elements of a machine tool, or in other applications wherein it is required that a moving element (whether moving in a straight line, reciprocatory, orbital, rotary or other known path) be stopped in a particular reference position. However, in order to facilitate the ensuing discussion, the invention will here be described in conjunction with apparatus and methods for controlling the stop or "dead" position of the driven components of a sewing machine; i.e., the driven needle which reciprocates along a straight line path and the driven shaft which rotates about a fixed axis.

In the illustrative form of the invention, the sewing machine 10 is mounted on a table 11 and includes an upright pedestal 12 rigidly secured to the table top. Projecting laterally from and integral with the upper end of the pedestal 12 is horizontal arm 14, the latter being substantially parallel with and spaced above the top of the table so as to overlie material being sewn. The free end of the arm 14 terminates in a hollow head 15 which houses and supports the upper end of a reciprocatory needle bar 16, the latter carrying a vertically disposed sewing machine needle 18 adapted to be driven into and out of material supported on the table top to effect stitching thereof. In the exemplary device, the needle bar 16 is coupled in a conventional manner (not shown) to one end of a horizontally disposed shaft 19 supported and journalled for rotation in the arm 14 and the upper end of the pedestal 12, the other end of the shaft projecting laterally of the pedestal (i.e., to the right as viewed in FIGS. 1 and 2). As is conventional in sewing machines of the type illustrated, a bifurcated presser foot 20 (best illustrated in FIG. 5) is supported in the head 15 for endwise movement therein, the presser foot being normally biased into a position wherein the material being stitched is held flat and in snug conformity to the table top.

Figure 2:
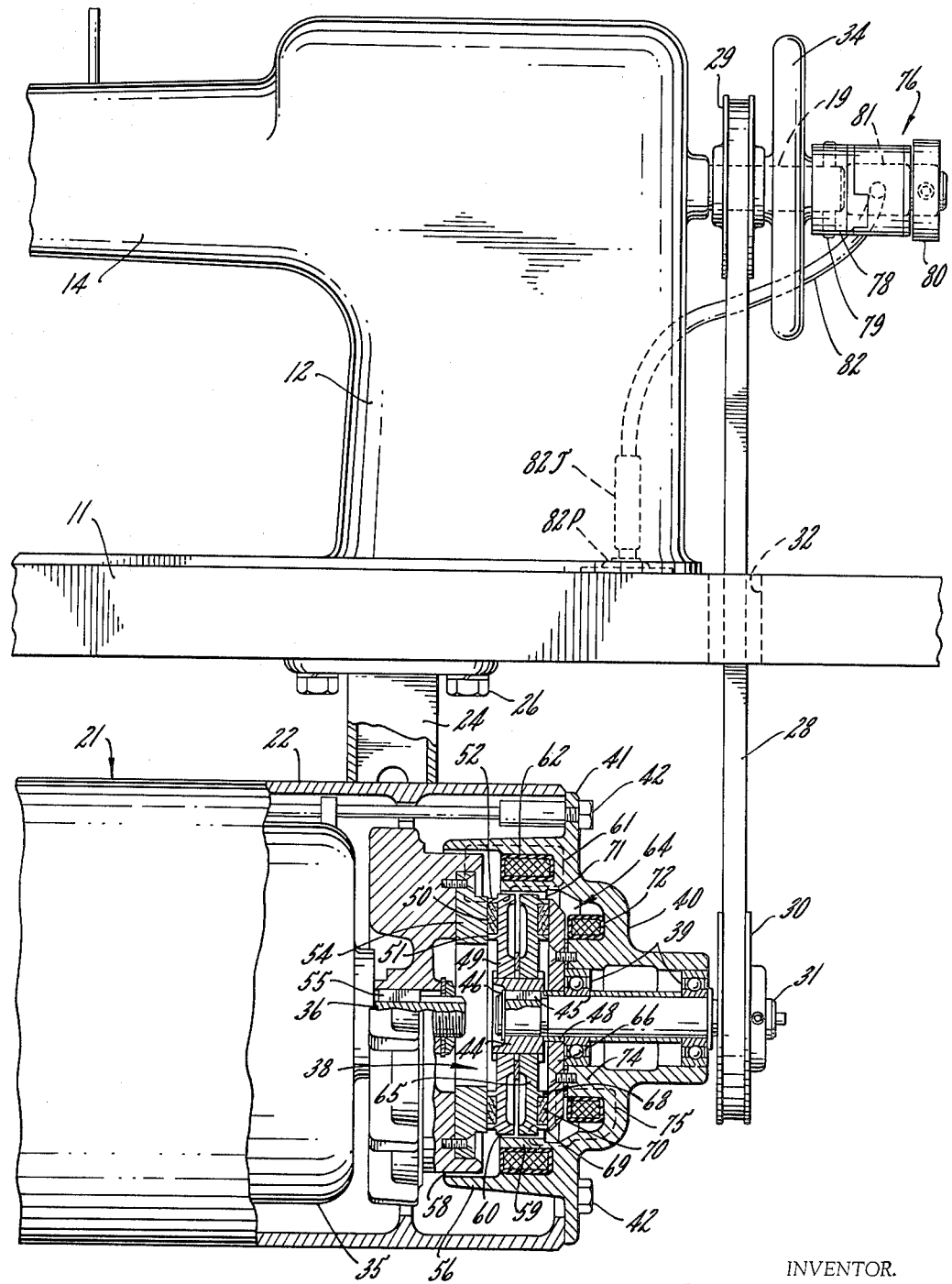
FIG. 2 is an enlarged fragmentary front elevation, in partial section, of the machine shown in FIG. 1, here illustrating details of the electromagnetic clutch and brake assemblies used in conjunction with the present invention.

For the purpose of driving the needle bar 16 and shaft 19 during an operating cycle of the sewing machine 10, a power transmitter, generally indicated at 21, is rigidly secured to the lower surface of the table 11. In the illustrative device, this is accomplished by securing the housing 22 of the power transmitter to the free extremities of a yoke-like bracket 24 by means of bolts 25 or other suitable fasteners. The bracket 24 is in turn secured directly to the bottom of the table 11, for example, by bolts 26 or the like, as best shown in FIG. 2. In order to permit transmission of power from the transmitter 21 to the shaft 19 of the sewing machine 10, a drive belt 28 is tained about drive pulleys 29, 30 which are keyed or otherwise non-rotatably secured to respective different ones of the laterally projecting extremities of the shaft 19 and the output shaft 31 of the transmitter 21. As here shown, the drive belt 28 passes through an opening 32 formed in the table 11. A handwheel or flywheel 34 is secured to the outboard end of the shaft 19 adjacent to the pulley 29 in a manner commonly employed with sewing machines of the type illustrated.

To facilitate an understanding of the present invention, the general organization and operation of the power transmitter 21 will be briefly described hereinbelow. Those interested in a more complete operational and structural description of the transmitter 21 are referred to the copending application of Philip E. Myers, Serial No. 239,613, filed November 23, 1962, and assigned to the assignee of the present invention.

Referring to FIG. 2, it will be noted that the power transmitter 21 includes an electric motor 35 which is mounted within the tubular housing 22 and which is coupled to any suitable current source (not shown) for effecting energization thereof. As here shown, the motor shaft 36 is adapted to be selectively and disengageably connected to the output shaft 31 of the transmitter 21 by means of an electromagnetic friction clutch, generally indicated at 38. To this end, the shaft 31 is maintained in axially spaced, coaxial relation with respect to the motor shaft 36, as for example, by journalling the shaft 31 in spaced antifriction bearings 39 carried by the hub 40 of an end cap 41—the latter being rigidly secured to the housing 22 by means of suitable fasteners 42. The inner end of the shaft 31 (i.e., the left end, or the end adjacent the motor shaft 36 as viewed in FIG. 2) has mounted thereon an externally splined annular ring 44 which is keyed to the shaft 31 for simultaneous rotation therewith by means of a suitable key 45. A snap ring 46 and annular spacer 48, the latter being disposed between the ring 44 and the innermost bearing 39, are utilized to hold the ring 44 in a fixed axial position relative to the shaft 31.

For the purpose of completing a disengageable driving connection, the electromagnetic friction cluch 38 includes an internally splined disk 49 of magnetic material which is loosely fitted on the externally splinded ring 44, the mating splined arrangement permitting freedom of limited axial movement between the disk 49 and ring 44 while providing a rotatable drive connection therebetween. A ring of friction material 50 is secured to the inner face of the disk 49, the friction material being confined within radially spaced annular flanges 51, 52 integral with the disk. The inner radial surfaces or pole faces of the flanges 51, 52 are flush with the inner radial surface of the friction material 50. The arrangement is such that the inner radial faces of the friction material 50 and the flanges 51, 52 are juxtaposed to the outer radial face of a flywheel 54, the latter being nonrotatably secured, as by a key 55, to the motor shaft 36.

In the exemplary construction, the flywheel 54 projects into a tubular flange 56 integral with the end cap 41, there being an annular radial gap 58 between the cylindrical telescoped surfaces of the flywheel 54 and the flange 56.

A second tubular flange 59, integral with the end cap 41 and having a smaller diameter than the flange 56, projects towards, but terminates short of, the outer radial face of the flywheel 54, the flange 59 being dimensioned to surround the outer peripheral face of the disk 49 and defining therebetween a second radial gap 60. Thus, the end cap 41 with its flanges 56, 59, flywheel 54, and disk 49 with its flanges or pole faces 51, 52 define a toroidal shaped flux circuit 61 including radial gaps 58 and 60, which gaps are sufficiently large in area to carry the flux required for producing the desired high density between the driving and driven radial faces of the flywheel 54 and the disk 49 and its ring of friction material 50. For creating the flux threading through the circuit 61, a multiple turn annular clutch coil 62 is secured to the end cap 41 between the flanges 56, 59 and within the circuit 61. As a consequence of this construction, when the coil 62 is energized, the flux threading axially through the opposed clutch faces draws the disk 49 into intimate clutched engagement with the driving flywheel 54.

The illustrative power transmitter also includes an electromagnetic friction brake, generally indicated at 64, having an internally splined disk 65 of magnetic material loosely mounted on the externally splinded ring 44 outboard of the clutch disk 49 and adapted to be selectively drawn into intimate frictional braking engagement with a stationary plate 66 rigidly secured to the end cap 41. The brake disk 65 is formed in a manner similar to the clutch disk 49, here being provided with flanges 68, 69 defining radial pole faces flush with the outer face of a ring of friction material 70. The latter being confined in the annular channel defined by the flanges 68, 69. The disk 65 is dimensioned so as to define a radial gap 71 between its outer peripheral edge and the inner surface of the flange 59.

An annular multiple turn brake coil 72 is securely mounted within the end cap 41, the coil being disposed between the tubular flange 59 and a smaller tubular flange 74 integral with the end cap. As shown in FIG. 2, the coil 72 is disposed within a toroidal shaped flux circuit 75 defined by the end cap 41 with its flanges 59, 74, brake plate 66, and brake disk 65 with its flanges or pole faces 68, 69, the flux circuit 75 here including radial gap 71. Thus, when the brake coil is energized, the disk 65 is drawn into gripping engagement with the plate 66.

In accordance with one of the important aspects of the present invention, provision is made for continuously detecting the position, or phase, of the driven components of the system and for insuring that whenever these components stop in other than a desired position upon application of full braking power thereto, the brake energizing circuit is immediately interrupted and the clutch energizing circuit is completed in such a manner that a pulsating voltage is applied to the clutch coil 62 for stepping the driven system components to the desired stop or "dead" position and, upon arrival at the desired position, the brake is again energized. To this end, a position sensor or phase detector 76 which, in the construction shown by way of example in FIGS. 1–5, and 8, conveniently takes the form of a rotary switch, is mounted on the projecting end of the needle driving shaft 19 adjacent to the handwheel 34, the sensor here providing a continuous indication of the position of the driven system components relative to the desired stop or dead position thereof.

In carrying out the phase sensing aspect of the invention, the phase sensor or rotary switch 76 is positioned and arranged so as to establish both a fixed point located on and movable with a driven system component and a stationary reference point adjacent to the path of movement of the fixed point. The two points are correlated with one another and with the desired stop position such that alignment of the points is indicative that the driven system components are in the desired stop position while misalignment of the points is indicative that the driven system components are not in the desired stop position. Under the latter condition, the illustrative phase sensor 76 transmits a signal which is effective to deenergize the brake coil 72 and to apply a pulsating voltage across the clutch coil 62 for stepping the driven components into the desired stop position.

For the purpose of transmitting signals that are indicative of the position of the driven system components, the exemplary rotary switch 76 includes a tubular housing 78 (best illustrated by reference to FIGS. 2 and 3 conjointly) which is rigidly secured to the projecting end of the shaft 19 for simultaneous rotation therewith as, for example, by a set screw 79. The outer end of the housing 78 is journalled for rotation within a stationary collar 80 by suitable bearings (not shown), the collar here being integral with a stationary contact arm 81 carrying wipers W1, W2 and W3 (FIG. 8). Rotation of the collar 80 and contact arm 81 is precluded by a cable 82 which carries the conductors for the contact wipers, the cable having a jack 82J at its free end which is detachably secured in a plug 82P disposed in the top of the table 11. The rotating switch housing 78 has formed on its outer surface a layer of insulating or barrier material 84 upon which is disposed an annular conductive segment 85 positioned for sliding contact with the wipers carried by the contact arm 81.

Referring to FIGS. 2 and 4, it will be observed that the conductive segment 85 has respectively formed in its opposite edges a pair of cutout portions which define a pair of exposed areas ND, NU of insulating material 84. The arrangement is that that the exposed areas ND, NU are, as best shown in FIG. 8, positioned to be engaged with the wipers W1, W3 respectively once during each revolution of the shaft 19, and hence once for each complete reciprocation of the needle bar 16 (FIG. 1). It will be appreciated from the foregoing that the exposed area ND of insulating material (which here defines the fixed point on, and rotatable with, the driven system components) and the wiper W1 (which here defines the stationary reference point adjacent the path of movement of the point ND) may be readily positioned relative to one another and to the driven system components such that the latter will occupy; a known desired position, for example, the needle down position when the two points are aligned. Similarly, the exposed area NU of conductive material 84 and the wiper W3 may be readily positioned relative to one another and to the driven system components such that the latter will occupy a different known desired position, for example, the needle up position, when the wiper W3 engages the portion NU. And, of course, any other number $n$ of wipers could be correlated with respective ones of any other number $n$ of cutout portions on the conductive segment 85 to provide an indication that the driven system components are then in a particular one of any other number $n$ of known desired positions.

In the illustrative device, since the wipers W1, W3 are carried by a common contact arm 81, they are, in this instance, aligned while the exposed areas ND, NU of conductive material are disposed on diametrically opposite sides of the housing 78. Thus, when the wiper W1 engages the portion ND (i.e., the needle down position), the wiper W3 is 180 degrees out of phase with the area NU. If therefore requires 180 degrees of shaft movement to align the wiper W3 with the area NU (i.e., the needle up position) and, during this ½ revolution of shaft movement, the needle bar 16 will move from its lowermost to its uppermost position. However, the cutout portions of the conductive segment 85 and the wipers W1, W3 could occupy any other desired relative positions in so long as a respective one of the points defined by the former is in engagement with a respective one of the wipers at the instant that the driven system components occupy the desired stop position. Merely by way of example, the exposed areas ND, NU could be aligned and the wipers W1, W3 could be supported on diametrically opposite sides of the housing 78.

To permit the operator to selectively stop the exemplary needle 18 in either the down or up position, provision is made for selectively activating the needle down sensor (defined by area ND and wiper W1) and the needle up sensor (defined by the area NU and the wiper W3) one at a time. To this end, the sensors are selectively placed in the brake energizing circuit by means of a position selector switch PSS (FIGS. 1 and 5) adapted to be actuated by the operator, the switch being biased in any suitable manner to normally activate one of the sensors, e.g., the needle down sensor ND, W1. Thus, the operator need only shift the switch PSS against the biasing means to its other state to selectively activate the needle up sensor NU, W3. As best illustrated in FIG. 5, such operator control is effected by means of a knee actuated L-shaped lever 86 having a knee pad 88 at one end and an actuator arm 89 at its opposite end, the lever here being pivoted at 90 to a bracket 91 attached to the lower surface of the table 11. The arrangement is such that if the operator wishes to stop the machine with the needle 18 in the up position, it is merely necessary to shift the knee pad 88 laterally with the knee, thus pivoting the lever 86 (in a counterclockwise direction as viewed in FIG. 5) about the pivot 90 to engage the actuator arm 89 with the switch actuator $PSS_a$ and depress the latter.

Under normal operating conditions, when the operator wishes to stop the machine 10 in the needle up position, it is often desirable to shift the presser foot 20 upwardly so as to free the material and facilitate its removal. To accomplish this, the knee actuator lever 86 is also coupled, in a conventional manner, to the presser foot 20 through suitable linkage for effecting vertical movement of the latter against the biasing effect of a spring 92. In the exemplary apparatus shown in FIG. 5, this linkage takes the form of a lever 94 which is pivoted at 95 to, and extends through the horizontal arm 14 of the sewing machine 10. One end of the lever 94 projects into the head 15 and is coupled through a bracket 96 to a collar 98, the latter being rigidly secured to the upper end of the presser foot 20. The opposite end of the lever 94 is connected by a tie rod 99 to a lever 100 which is pivoted at 101 to the table 11 and which defines a cam surface 102. A cam actuator 104 integral with the lever 86 coacts with the cam lever 100 to cause pivotal movement of the latter.

Thus, when the operator shifts the knee pad 88 to the right as viewed in FIG. 5, two actions occur. First, the switch actuator $PSS_a$ is depressed to activate the needle up sensor NU, W3 (FIG. 8) and to cause the needle 18 to stop in the up position. Further movement of the pad 88 to the right, through the linkage defined by actuator 104, cam lever 100, tie rod 99, lever 94, bracket 96, and collar 98, then causes the presser foot 20 to shift upwardly against the bias of the spring 92.

The overall operation of the exemplary power transmission system and electrical control circuits associated with the form of the invention shown in FIGS. 1–5 will here be described in detail in conjunction with the schematic wiring diagram shown by way of example in FIG. 8.

In order to start an operating cycle for the sewing machine 10, the operator first turns the ON-OFF switch 106 to the ON state, thus coupling the terminals L1 and L2 (FIG. 8) of a suitable A.C. source (not shown) directly to the motor 35 (FIGS. 1 and 8) and to the power supply for the clutch-brake control circuit 108 (FIG. 8). At this time the motor 35 is running, the clutch coil 62 is deenergized, and the brake coil 72 is energized. The operator is now prepared to shift the knee actuator 86 (FIG. 5) to the right so as to drive the needle 18 to the needle up position (in a manner to be described below) and elevate the presser foot 20, thus permitting the material to be sewn to be properly positioned on the table. Pressure on the knee actuator is then released to return the presser foot 20 to the down position. The sewing machine 10 is now in readiness for an operating cycle.

In the exemplary circuit, the terminals L1, L2 of the A.C. source are coupled to the primary windings $w_1$, $w_2$ of a transformer T1 having secondary windings $w_3$, $w_4$. As here shown, the secondary winding $w_3$ provides a source of voltage for the brake and clutch coils through a voltage doubler 109 including diodes D1, D2 and capacitors C1, C2. The secondary winding $w_4$ of the transformer T1 provides a source of voltage for the needle positioning control circuit across the terminals of a full-wave rectifier, here shown as a bridge circuit 110.

In order to initiate a cycle of operation, the operator simply depresses or "toes" the foot treadle 111 (FIGS. 1 and 8). This serves to close the normal open contacts TS1 of a foot controlled treadle switch (not shown) disposed beneath the treadle 111, thus completing an energizing circuit for a foot switch relay FSR which controls normally open contacts FSR1, FSR2, FSR3 and normally closed contacts FSR4, FSR5. Closure of the normally open contacts FSR1 completes an energizing circuit for a clutch relay CR which, in turn, controls normally open contacts CR1, CR2 and normally closed contacts CR3. Opening of the contacts CR3 breaks the energizing circuit for the brake coil 72, thus deenergizing the latter. At the same time, closure of the normally open contacts FSR2 completes an energizing circuit for clutch coil 62 through the now closed contacts CR1, the clutch coil 62, a rheostat 112, and the contacts FSR2. The sewmachine 10 (FIG. 1) is now in operation and the speed at which it is operated is selectively controlled by the operator by the simple expedient of selectively positioning the treadle 111 and hence adjusting the rheostat 112 which is controlled thereby. That is, the voltage applied to the clutch coil 62 may be varied anywhere between a maximum value (i.e., with the treadle 111 fully toed) and zero (i.e., with the treadle 11 "heeled"), thus providing an infinitely variable speed control.

In order to deenergize the clutch coil 62 and energize the brake coil 72 so as to stop the driven components of the system, it is simply necessary for the operator to heel the treadle 111 in a conventional manner. When the treadle 111 is heeled, the treadle switch contacts TS1 are opened, thus breaking the energizing circuit for the foot switch relay FSR. Upon deenergization of the relay FSR, the contacts FSR1, FSR2 open, thus simultaneously deenergizing the clutch relay CR and the clutch coil 62. At this time, the normally closed contacts CR3 controlled by the clutch relay CR reclose to complete an energizing circuit for the brake coil 72. When the clutch coil 62 is deenergized and the brake coil 72 is energized, the driven components of the exemplary sewing machine 10 are brought to a complete stop. However, since the stop positioning controls have not yet been activated, the driven system components will stop randomly at any one of an infinite number of positions—that is, in the exemplary sewing machine 10 the needle 18 may stop at its extreme up or down positions or any position therebetween.

Referring to FIG. 8, it will be observed that the voltage source for the brake coil 72 is derived from the terminals $t1$, $t2$ of the voltage doubler 109. As a consequence of this construction, at the instant the brake is energized, a maximum voltage, for example, approximately 300 volts, is applied across the terminals of the brake coil 72 through the contacts CR3 and a capacitor C3. However, when the capacitor C3 charges, the energizing circuit for the coil 72 is completed through a current limiting resistor R1 which serves to drop the voltage supplied to the coil 72 to its standard rated capacity, for example, approximately 90 volts. In the energizing circuit for the clutch coil 62, on the other hand, the voltage is derived from the terminals $t1$, $t3$ of the voltage doubler 109—that is, across the terminals of only the capacitor C2 which acts as a filter to smooth the pulsating voltages applied to the coil. Thus, the clutch coil is energized at a considerably lower voltage level than the brake coil, a level which, for example, may be only approximately 60 volts.

It will be appreciated from the foregoing description that when the driven system components are braked, they will come to rest either in or out of the desired stop position, for example, the needle down position. If the needle 18 (FIGS. 1 and 5) should happen to randomly stop in the desired position, the operating cycle for the sewing machine 10 is complete. On the other hand, if the needle 18 happens to stop randomly in any other position, as is more likely to be the case, provision must be made for driving the needle into the desired position.

In keeping with the present invention, provision is made for momentarily inhibiting the needle positioning controls so as to insure that the driven system components come to a complete stop, at which time the position sensor 76 (FIGS. 3 and 8) is effective for transmitting a signal representative of conditions of misalignment between the needle down sensor elements W1, ND. To accomplish this, during periods when the treadle 111 is depressed (i.e., when the foot switch relay FSR and clutch coil 62 are energized and the machine 10 is in operation), the normally open contacts FSR3 controlled by the relay FSR are closed, thus completing an energizing circuit for a positioning control relay PCR (which controls normally closed contacts PCR1, PCR2) and a charging circuit for a capacitor C4 coupled across the terminals of the relay PCR. When the operator heels the treadle 111 to brake the machine 10, the contacts FSR3 reopen to break the energizing circuit for the relay PCR. However, the latter is "held in" (i.e., remains energized) until the capacitor C4 dissipates its charge through the coil of the relay PCR, at which time the contacts PCR1 and PCR2 reclose. During the momentary time period that the relay PCR is held in after the treadle 111 is heeled, the brake 64 (FIG. 2) is energized in the manner described above and the driven system components come to rest.

In the event that the needle stops in the desired down position, such condition will be detected by alignment of the normally activated needle down sensor W1, ND (FIGS. 2, 4 and 8). That is, the wiper W1 will be engaged with the exposed area ND of insulating material 84 and no energizing circuit for the clutch coil can be completed until the operator either again toes the treadle 111 or until the needle down sensor W1, ND is deactivated and the needle up sensor W3, NU is activated.

In carrying out the present invention, provision is made for deenergizing the brake coil 72 and energizing the clutch coil 62 in order to drive the driven system components into the desired stop position whenever they happen to stop at any other position. To this end, and assuming that the machine 10 is preset to stop in the needle down position (i.e., the needle down sensor W1, ND is activated), when the normally closed contacts PCR1 reclose, an energizing circuit is completed for the clutch relay CR from the plus terminal of the rectifier 110 through the coil of relay CR, wiper W2, conductive segment 85 on the rotary switch 76, wiper W1, the normally closed contacts PSR1 controlled by a needle position selector relay PSR, and the contacts PCR1, thus energizing the clutch relay CR. When the latter relay is energized, its contacts CR3 open to deenergize the brake coil 72, and the contacts CR1 close to complete an energizing circuit for the clutch coil 62 through the normally closed contacts FSR4 controlled by the foot switch relay FSR (the relay FSR remaining deenergized since the foot treadle 111 is still heeled and the contacts TS1 of the treadle switch are still open).

In keeping with the invention, provision is made for "pulsing" the clutch coil 62 during a needle positioning operation so as to "step," or "inch," the driven system components into the desired stop position, thereby precluding the possibility of overshooting the desired stop position. To accomplish this, the energizing circuit for the clutch coil 62 (i.e., the circuit including contacts FSR4) also includes normally closed contacts PR1 controlled by a pulsing relay PR. The arrangement is such that when the clutch relay CR is energized (i.e., when the wiper W1 is engaged with the conductive segment 85 on the position sensor 76), an energizing circuit for the pulsing relay PR is completed through the normally closed contacts FSR5 of the relay FSR, the contacts CR2 of the clutch relay CR, and a current limiting or timing resistor R2. Current flow through the resistor R2 causes a capacitor C5 connected across the terminals of the relay PR to charge and, when the capacitor has charged sufficiently, the relay PR is energized, thus opening the normally closed contacts PR1 and deenergizing the clutch coil 62. At this instant, both the clutch coil 62 and the brake coil 72 are deenergized. Upon energization of the pulsing relay PR, a set of normally open contacts PR2 controlled thereby are closed, thus shorting out the capacitor C5 and deenergizing the relay PR. This causes the contacts PR1, PR2 to transfer and again completes an energizing circuit for the clutch coil 62. The capacitor C5 is then recharged in the same manner, and the pulsing relay PR is again energized when the charge on the capacitor reaches a fixed level. Thus, although the clutch relay CR remains continuously energized, the clutch coil 62 is pulsed because of the periodic transfer of the contacts PR1 controlled by the pulsing relay PR.

Because of the pulsing of the clutch coil 62, the driven system components are stepped or inched towards the desired stop position. As a practical matter, it has been found that the clutch coil 62 will be pulsed anywhere from one to about fifteen times dependent upon the actual position in which the machine 10 stops, assuming, of course, that it stops in other than the desired position. At the instant that the needle 18 arrives in the selected down position, the wiper W1 will contact the exposed area ND of insulating material 84, thus breaking the energizing circuit for the clutch relay CR, and completing an energizing circuit for the brake coil 72 through the now closed contacts CR3. At the same time, opening of the contacts CR1 deenergizes the clutch coil 62. The sewing machine needle 18 is now positively braked in the desired needle down stop position.

In accordance with another aspect of the invention, provision is made for momentarily deenergizing the brake coil 72 and pulsing the clutch coil 62 to permit "single stitch" operation in the event that the operator wishes to extend the stitch line slightly before shifting or removing the material. To this end, a foot controlled switch FS (FIGS. 1 and 8) is disposed laterally of the foot treadle 111 in position to be selectively actuated by the operator simply by shifting her foot laterally (to the right as viewed in FIG. 1) on the heeled treadle 111. When this occurs, the normally open contacts FS1 (FIG. 8) controlled by the foot switch FS are momentarily closed, thus completing an energizing circuit for the clutch relay CR through the wiper W3, the conductive segment 85, the common wiper W2, and the coil for the clutch relay CR. Energization of the relay CR will again deenergize the brake coil 72 and complete an energizing circuit for pulsing the clutch coil 62 in the manner described above. It is, of course, only necessary to momentarily shift the actuator for the foot switch FS (FIG. 1) to the right, since as soon as the clutch coil is energized, the conductive segment 85 will again move until it contacts the wiper W1. Thereafter, reopening of the contacts FS1 will be ineffective to deenergize the clutch relay CR—that is, the relay CR will remain energized through the wiper W1 until the wiper W1 and the exposed area ND of the insulating material 84 are again aligned, at which time the needle 18 will again stop in the down position after having made one additional stitch.

Of course, if desired, the operator may make the single stitch operation repetitive (i.e., "stitch-by-stitch" operation) by the simple expedient of holding her foot against the actuator for the foot switch FS. In this event, the clutch coil 62 will be continuously pulsed so as to step the driven system components incrementally through a stitch-by-stitch operation and, when the operator next releases the foot switch FS, the needle 18 will come to rest in the desired needle down position the next time that the wiper W1 engages the exposed area ND of barrier material 84.

When the operator wishes to remove the material from the machine, it is merely necessary that she shift the knee actuator lever 86 to the right (as viewed in FIGS. 1 and 5) in the manner previously described. Such movement will first depress the actuator $PSS_a$ (FIG. 5) of the position selector switch PSS, thus closing the contact PSS1 of the switch and completing an energizing circuit for the position selector relay PSR. When the relay PSR is energized, its normally closed contacts PSR1 (i.e., the contacts associated with the needle down sensor W1, ND) are opened, thus deactivating the needle down sensor. At the same time, the normally open contacts PSR2, PSR3 controlled by the relay PSR are closed. Closure of the contacts PSR2 activates the needle up sensor W3, NU, while closure of the contacts PSR3 completes a holding circuit for the position selector relay PSR through its own contacts PSR3 and through the normally closed contacts PCR2 controlled by the positioning control relay PCR. Thus, the position selector relay PSR will remain energized, and the needle up sensor W3, NU will remain activated, until the next time that the operator toes the treadle 111 so as to energize the foot switch relay FSR. Energization of the relay FSR closes the normally open contacts FSR3 to complete an energizing circuit for the positioning control relay PCR, thus opening the contacts PCR2, deenergizing the relay PSR, and reactivating the needle down sensor W1, ND.

Assuming, therefore, that the machine is stopped in the needle down position and the operator wishes to remove the material, it is simply necessary to activate the needle up sensor W3, NU in the manner described above. This will immediately complete an energizing circuit for the clutch relay CR through the coil of the relay CR, the common wiper W2, the conductive segment 85, the wiper W3 (which is 180 degrees out of phase with the exposed area NU of barrier material 84 since the needle is down), contacts PSR2, and contacts PCR1. Energization of the clutch relay will, in the manner previously described, deenergize the brake coil 72 and permit pulsing of the clutch coil 62 to step the driven system components towards the needle up position. However, in this instance, the components will be pulsed, or stepped, through only ½ of a revolution (i.e., to the needle up position), at which time engagement of the wiper W3 with the exposed area NU of barrier material 84 will break the energizing circuit for the clutch relay CR and the needle 18 will be positively braked in the up position. Further lateral movement of the knee actuator lever 86 will now raise the presser foot 20 (FIG. 5) in the manner previously described, thus permitting removal of the material being sewn.

If the operator now wishes to commence another operating cycle, she need merely position the material to be sewn beneath the needle 18, release the knee actuator lever 86 to lower the presser foot 20, and again toe the treadle 111. This serves to close the contacts TS1 of the treadle switch and again energizes the foot switch relay FSR. Thus, the brake coil 72 is deenergized and the clutch coil 62 is energized through the treadle controlled rheostat 112 and the contacts FSR2. At the same time, the positioning control relay PCR is energized through the contacts FSR3, thus opening the contacts PCR1 and PCR2. Opening of the contacts PCR1 prevents activation of either the needle up sensor W3, NU or the needle down sensor W1, ND. Opening of the contacts PCR2 breaks the energizing circuit for the position selector relay PSR, deenergizing the latter, closing the contacts PSR1, and opening the contacts PSR2. Hence, the next time that the operator heels the treadle 111, the positioning control relay PCR will again be deenergized after a short delay resulting from dissipation of the charge on capacitor C4 and when the relay PCR is deenergized, the contacts PCR1 close to again activate the "needle down" sensor W1, ND through the contacts PSR1.

While the invention has hereinabove been described in connection with a novel apparatus for controlling the dead position of a driven object, those skilled in the art will appreciate that the sequence of operations described herein also defines a novel method for controlling the stop positions of such objects. That is, a first reference point (e.g., point ND) is selected on the driven object bearing a known phase relation to the desired stop position. A second reference point (e.g., wiper W1) is established adjacent to the path of movement of the driven object and correlated with both the first point and the desired stop position such that when the two points are aligned, the object is in the desired stop position. Full braking power is then applied to the object irrespective of its position and speed, thus rapidly bringing the object to a complete stop. Conditions of alignment or misalignment between the two points are then sensed and, if the latter condition is detected, the brake is deenergized and the clutch is pulsed so as to step the driven system components to the desired stop position where the points are aligned. Upon arrival at the desired position, the brake is reenergized and the clutch deenergized.

Turning next to FIGS. 6 and 7, there is shown a slightly modified position sensor 76' which is also used for controlling the stop position of a driven object in accordance with the present invention. In view of the similarities in the two exemplary stop positioning control systems, like parts in both systems will be designated by identical reference numerals, and those parts not common to the two systems will be designated by different reference numerals.

As best shown in FIG. 6, the position sensor or phase detector 76' includes a pair of transducers, which here conveniently take the form of photocells PCD, PCU or similar photosensitive devices of the type characterized by their ability to produce an output signal upon detection of a change in the quantum of light photons impinging thereon. The exemplary photocells are supported on brackets 114 which are secured to the pedestal 12 of the sewing machine 10 on diametrically opposite sides of the shaft 19 by means of fasteners 115. The arrangement is such that the photocells PCD, PCU respectively define reference points adjacent the path of movement of a driven system component (here the handwheel 34), such points here being correlated with the desired needle down and needle up stop positions—that is, the photocells PCD, PCU here correspond respectively to the wipers W1, W3 carried by the contact arm 81 (FIG. 3) and shown in FIG. 8. For the purpose of generating signals in the photocells PCD, PCU which are indicative of the position of the driven system components, provision is made for changing the quantum of photons impinging upon the photocells when a predetermined point on a driven component is aligned with the photocells. In the construction shown by way of example in FIGS. 6 and 7, this is accomplished by securing a masking lug 116 on the periphery of the handwheel 34 by means of a threaded fastener 118, with the lug defining a fixed point on the handwheel correlated with both the desired stop positions and the photocells PCD, PCU (such fixed point here corresponding to the points ND, NU shown in FIG. 4). That is, the lug 116 is positioned on the handwheel 34 in such a manner that when it is aligned with the photocell PCD, the sewing machine needle 18 (FIGS. 1 and 5) will be in the down position. Therefore, when the lug 116 is aligned with the photocell PCU, the needle 18 will be in the up position. As here shown, the lug 116 is positioned to alternately block the transmission of light from a pair of light sources LSD, LSU to respective ones of the photocells PCD, PCU. The light sources LSD, LSU are held in fixed, aligned, spaced relation with respect to the photocells PCD, PCU respectively by means of a U-shaped support bracket 119 (FIG. 7) secured to a standard 120, with the vertically extending arms 119D, 119U of the bracket respectively supporting the light sources LSD, LSU. The standard 120 is here secured to the top of the table 11 by means of bolts or similar fasteners 121.

The foregoing arrangement is such that the photocells (for example, the photocell PCD) will be subjected to light at all phases or positions of the driven system components except for the desired stop position, at which time the lug 116 will be interposed between the light source LSD and the photocell PCD, thus generating a signal in the latter indicative that the driven system components are in the desired needle down position. Of course, while the illustrative system has been described in conjunction with photocells which produce control signals when they are in the "dark" state (i.e., light from the source is blocked by the lug 116), those skilled in the art will appreciate that they can also produce control signals when they detect the presence of light as contrasted with the absence of light. For example, it would be entirely feasible to mount a disk on the handwheel with the disk dimensioned to normally block the transmission of light to the photocells. In such a construction it would simply be necessary to form a notch in the peripheral edge of the disk such that the photocells will detect the presence of light only when the notch is disposed between each aligned light source and photocell (i.e., once for each revolution). This same result could be achieved by positioning the photocells and light sources on opposite sides of the handwheel rim and then forming an opening in the latter which would be positioned between a given light source and its associated photocell once during each revolution of the handwheel. Alternatively, a light source could be physically mounted on, or embedded in, the handwheel 34 so as to sweep past the faces of the photosensitive position detectors PCD, PCU.

While the exemplary modified construction shown in FIGS. 6 and 7 has been described in connection with photosensitive transducers PCD, PCU, those skilled in the art will appreciate that the particular type of transducer and signal generating system employed is not critical to the present invention and numerous other types of commercially available transducers will suffice. Merely by way of example, the transducers PCD, PCU could take the form of magnetic transducers while the lug 116 could be formed of magnetic material such that voltage pulses would be induced in the transducers as the lug sweeps across the exposed faces thereof.

The overall operation of the exemplary power transmission system and electrical control circuit associated with the modified form of position sensor 76' shown in FIGS. 6 and 7 will here be described in detail in conjunction with the schematic wiring diagram shown by way of example in FIG. 9.

In order to start an operating cycle for the sewing machine 10, the operator first turns the ON-OFF switch 106' to the ON state, thus coupling the primary winding $w_5$ of a transformer T2 to the terminals L1, L2 of a suitable A.C. source (not shown). As here shown, the secondary windings $w_6$, $w_7$, $w_8$ of the transformer T2 provide voltage sources for the motor 35, a phase or position sensing circuit 122, a clutch control circuit 124, and a brake control circuit 125. In this instance, the motor 35, clutch coil 62, and the components of the phase sensing circuit 122, all derive their voltage supplies from the secondary winding $w_6$; the brake coil 72 derives its voltage supply from the secondary winding $w_7$; and the winding $w_8$ supplies a voltage source for a foot switch relay FSR' associated with the treadle 111, or foot controller. Hence, after the operator turns the ON-OFF switch 106 to its ON state (assuming that the treadle 111 is heeled), the motor 35 is running, the clutch coil 62 is deenergized, and the brake coil 72 is energized.

To facilitate an understanding of a general operating cycle for a sewing machine 10 utilizing the modified sensor 76′, operation of the phase sensing control circuit 122 will first be described. As shown in FIG. 9, the secondary winding $w_6$ of the transformer T2 is coupled to the primary winding $w_9$ of a filament transformer T3 through the normally closed contacts FSR′1 controlled by the foot switch relay FSR′. The secondary winding $w_{10}$ of the transformer T3 is coupled directly to the filaments of the light sources LSD, LSU. Thus, when the switch 106 and the contacts FSR′1 are both closed, the light sources LSD, LSU are energized. At the same time, the winding $w_{10}$ is coupled to the input terminals of a voltage doubler 126 which is similar to the voltage doubler 109 (FIG. 8) previously described. In this instance, the voltage doubler provides a rectified voltage source for a transistor 128, the latter being coupled to a selectable one of the photocells PCD, PCU through the contacts PSS1 of the position selector switch PSS (FIGS. 5 and 9). As here shown, the position selector switch is in its normal position with the contacts PSS1 coupling the anode of the needle down photocell PCD to the base 128b of the transistor 128 through a current limiting resistor R10. The cathodes of the photocells PCD, PCU are both coupled directly to the negative terminal of the voltage doubling rectifier 126.

As a consequence of this construction, when the photocell PCD is subjected to light, its resistance is lowered, thus decreasing the resistance in the collector-base circuit of the transistor and causing the latter to conduct. The collector 128c of the transistor is here coupled to one terminal of a clutch relay CR′ having its other terminal connected to the negative terminal of the rectifier 126. Therefore, when the transistor 128 conducts (i.e., when the photocell PCD detects light), the relay CR is energized, thus opening normally closed contacts CR′1 (in the brake control circuit 125) and closing normally open contacts CR′2 (in the clutch control circuit 124) controlled by the relay CR. When the masking lug 116 (FIGS. 6 and 9) is again interposed between the light source LSD and the photocell PCD, the resistance of the latter is abruptly increased thereby abruptly increasing the resistance in the collector-base circuit of the transistor 128, turning the transistor OFF and deenergizing the relay CR′. At this time, the contacts CR′1 in the brake control circuit 125 reclose and the contacts CR′2 in the clutch control circuit 124 reopen.

In the exemplary phase sensing circuit 122, provision is made for insuring that the transistor 128 is turned OFF and remains OFF until such time as the resistance in the collector-base circuit drops to a level sufficient to turn the transistor ON. To this end, a resistor R11 is connected from the base 128b to the emitter 128e of the transistor, the emitter here being connected directly to the positive terminal of the rectifier 126.

Keeping the foregoing operation of the phase sensing circuit in mind, it will be appreciated that when the operator toes the treadle 111 to initiate a stitching operation, the normally open contacts TS1′ of a treadle switch (not shown) disposed beneath the treadle are closed, thus completing an energizing circuit for the foot switch relay FSR′. Energization of the relay FSR′ opens the normally closed contacts FSR′1 controlled thereby, thus disconnecting the primary winding $w_9$ of the filament transformer T3 from the secondary winding $w_6$ of the transformer T2, thereby effectively disabling the phase sensing circuit 122. The circuit 122 will remain disabled, and the light sources LSD, LSU will remain extinguished, until the operator again heels the treadle 111, at which time the contacts TS1′ will reopen, the relay FSR′ will be deenergized, and the contacts FSR′1 will reclose to enable the phase sensing circuit.

When the operator toes the treadle and energizes the relay FSR′, normally closed contacts FSR′2 (in the brake control circuit 125) and FSR′3 (in the clutch control circuit 124) are opened, while normally open contacts FSR′4 (in the clutch control circuit 124) are closed. Opening of the contacts FSR′2 breaks the energizing circuit for the brake coil 72. Closure of the contacts FSR′4 simultaneously completes an energizing circuit for the clutch coil 62 through the treadle controlled rheostat 112. Thus, the coil 62 is coupled to the winding $w_6$ of the transformer T2 through the rheostat 112 and a half-wave rectifier, here shown as a diode D3. Suitable capacitors C6, C7 are provided for filtering the voltage supplied to the coil 62. The machine can now be operated at any desired speed simply by controlling the position of the foot treadle 111.

When the operator wishes to stop the sewing machine, she simply heels the treadle 111, thus opening the treadle switch contacts TS1′ and deenergizing the foot switch relay FSR′. At this time, the contacts FSR′1 reclose (enabling the phase sensing circuit 122), the contacts FSR′4 open (deenergizing the clutch coil 62), the contacts FSR′3 reclose (preparing a clutch energizing circuit for positioning the driven system components), and the contacts FSR′2 reclose to complete an energizing circuit for the brake coil 72. It will, upon comparison of FIGS. 8 and 9, be observed that the brake energizing circuits are substantially identical in the two illustrative systems. Thus, in the form of the invention shown in FIG. 9, the voltage applied to the brake coil 72 is derived from a voltage doubler 129 similar to the doubler 109 shown in FIG. 8. In this instance, the input terminals of the doubler 129 are coupled across the terminals of the winding $w_7$. One output terminal of the doubler 129 is coupled to the brake coil through the normally closed series contacts CR′1 and FSR′2 while the other output terminal of the doubler 129 is coupled to the brake coil 72 through a capacitor C8 and a resistor R12 disposed in parallel. When the contacts FSR′2 close, the maximum voltage developed across the voltage doubler 129 (e.g., approximately 300 volts) is applied to the coil 72. As the capacitor C8 charges, current is delivered to the brake coil through the limiting resistor R12 which serves to drop the voltage to a level required to operate the brake (e.g., approximately 90 volts).

The machine will now come to a complete stop. If the driven system components happen to stop randomly in the desired needle down position, the photocell PCD (which is now enabled since the treadle 111 is heeled and the contacts FSR′1 are closed) will not detect the presence of light because the lug 116 will be interposed between the light source LSD and the photocell PCD. Hence, the brake coil 72 will remain energized and the clutch coil 62 will remain deenergized—that is, the operating cycle will be complete.

However, if the needle 18 stops in other than the selected needle down position (FIG. 1), the photocell PCD will sense the presence of light transmitted from the source LSD. This will, in the manner described above, turn the transistor 128 ON, thus energizing the clutch relay CR′. When the relay CR′ is energized, the normally closed contacts CR′1 in the brake control circuit 125 open, thus deenergizing the brake coil 72. At the same time, a set of normally open contacts CR′2, controlled by the relay CR′ and disposed in series with the normally closed contacts FSR′3 in the clutch control circuit 124, are closed. This serves to complete an energizing circuit for the clutch coil 62 through a variable resistor R13 and the now closed contacts CR′2, FSR′3. The clutch 38 is now pulsed by the pulsating voltage derived from the half-wave rectifier D3 and applied to the coil 62, thereby stepping the driven system components towards the selected needle down stop position.

The clutch coil will continue to be pulsed until the masking lug 116 again intercepts the light beam emanating from the light source LSD, at which time the resistance of the photocell PCD will increase, and the transistor 128 will be turned OFF. The clutch relay CR' is then deenergized, opening contacts CR'2 to deenergize the clutch coil 62, and closing contact CR'1 to energize the brake coil 72. The sewing machine 10 now stops in the needle down position.

Provision is also made in the exemplary control circuit shown in FIG. 9 for permitting single-stitch operation. To this end, the normally open contacts FS1 controlled by the foot switch FS (FIG. 1) are coupled across the negative terminal of the voltage doubling rectifier 126 and the base 128b of the transistor 128. If the operator wishes to pulse the clutch coil 62 to initiate one full revolution of the shaft 19, she simply shifts her foot laterally on the heeled treadle 111 to close the contacts FS1, thus turning the transistor 128 ON. The contacts FS1 need only be closed momentarily since once the stepping operation starts, the selected needle down photocell PCD will again detect light and thereafter the transistor will remain ON until the masking lug 116 again intercepts the light beam emanating from the light source LSD. The needle 18 will then stop in the down position after having completed one additional stitch. Of course, if the operator wishes to continue the stitch line in a stitch-by-stitch mode, she need only hold the switch contacts FS1 closed and the transistor will remain ON, thus permitting continuous pulsing of the clutch coil 62.

In keeping with the invention, provision is also made for selectively activating either the needle down transducer PCD or the needle up transducer PCU, thus permitting the operator to selectively control the stop position of the needle 18. To accomplish this, lateral movement of the knee actuator lever 86 (FIGS. 5 and 9) transfers the contacts PSS1 of the position selector switch PSS from their normal biased position (coupling the anode of the needle down sensor PCD to the base 128b of transistor 128), to a position where the anode of the needle up sensor PCU is coupled to the base 128b of transistor 128. The needle up sensor PCU is now activated and the needle down sensor PCD is deactivated. Consequently, as long as the treadle 111 is heeled (thus enabling the phase sensing circuit 122 through contacts FSR'1) and the sensor PCU detects light, the transistor 128 will be turned ON and an energizing circuit for half-wave pulsing of the clutch will be completed through the resistor R13, contacts CR'2, contacts FSR'3, and the clutch coil 62. When the masking lug 116 intercepts the light beam transmitted from the source LSU, the transistor 128 will again be turned OFF and the needle 18 will automatically stop in the up position. Further movement of the knee actuator lever 86 (to the right as viewed in FIG. 5) will now elevate the presser foot 20 in the manner previously described, permitting removal of the material being sewn.

Those skilled in the art will appreciate that the modified phase sensor 76' (FIGS. 6 and 7) and control circuit therefor (FIG. 9) will act in a manner similar to the system shown in FIG. 8. In each instance, the brake coil 72 is selectively energized by the operator to apply full braking power to the driven system components irrespective of the position or speed of the latter. When the components stop, conditions of alignment or misalignment between a fixed point on the handwheel 34 (points ND or NU in FIG. 8 and point 116 in FIG. 9) and a selectable one of n reference points adjacent the handwheel (here n equals two points comprising wipers W1, W3 in FIG. 8 and transducers PCD, PCU in FIG. 9) are sensed and, where misalignment therebetween is detected, the brake coil 72 is deenrgized and a circuit is completed which permits pulsing of the clutch coil 62 to incrementally step the needle 18 to the selected position. Upon arrival at the selected position, the energizing circuit for pulsing the clutch is broken and the brake is again energized.

It will be apparent from the foregoing that a power transmission system embodying the features of the present invention will be characterized by its accuracy and reliability in operation. The equipment will not come to rest unless the selected wiper W1, W3 is in engagement with a selected fixed point ND, NU (FIG. 8) or unless the selected transducer PCD, PCU is aligned with a fixed point 116 (FIG. 9). Therefore, the control of the stop position is a positive control, and the needle can readily be stopped within a relatively narrow permissible range. At the same time, these desirable results are achieved without requiring relatively expensive auxiliary positioning motors or geared-down constant speed power take-offs of the type heretofore used in the prior art.

It will be understood that there is generally a permissible deviation in the actual dead position of a controlled driven object and the desired dead position thereof. Merely by way of example, in the exemplary sewing machine 10, if the driven system components are stopped within an angle of approximately plus or minus 25 degrees from a predetermined position, the requirements of the system will be achieved. That is, if the machine is preset to stop in the needle down position, it is not necessary that the needle stop in its extreme lowermost position and if the driven shaft 19 is stopped anywhere within an angle of plus or minus 25 degrees from the desired needle down position, the needle 18 will still project into the work a sufficient distance to permit pivoting of the work about the needle. Therefore, the terms up and down, or predetermined stop position, as used in the appended claims, are intended to embrace such small permissible deviations from a precise dead-center desired stop position.

I claim as my invention:

1. For driving the needle of a sewing machine at different selectively controllable speeds during a sewing operation and then stopping the needle in a predetermined position, the combination of, a power driven shaft, means coupling said shaft to said needle including a friction clutch having axially engageable driving and driven elements and an electric actuator for drawing said elements into different degrees of gripping engagement according to the energization of the actuator, an electric friction brake adapted when energized with said clutch release to exert a retarding torque on the driven element of said clutch to arrest the movement of said needle, control means including a device manually movable away from a stop position to release said brake and energize said actuator to engage said clutch according to the extent of movement of the device away from said stop position and thereby, by variable slipping of said clutch, vary the speed of reciprocation of said needle, said control means acting to deenergize said clutch and apply said brake when said device is returned to said stop position, a detector operable upon such stopping to sense the position of said needle and signal its disposal out of said predetermined position, and mechanism operable automatically under the control of said detector upon such stopping and when said needle is disposed out of said predetermined position to release said brake and effect intermittent reenergization of said clutch actuator during a plurality of spaced intervals until the needle reaches said predetermined position and then deenergize the clutch actuator and energize said brake to stop the needle in such position and thus by such automatic pulsing of the clutch reduce the speed of advance of the needle to said predetermined position whereby to stop the needle accurately in such position.

2. A sewing machine drive and needle positioning control as defined in claim 1 in which said mechanism operates independently of said manually controlled device to energize said clutch at spaced intervals and to substantially equal degrees during the successive intervals.

3. A sewing machine drive and needle positioning control as defined in claim 1 in which said mechanism effects energization of said clutch actuator at substantially constant voltage in each of said successive intervals of energization.

4. A sewing machine drive and needle positioning control as defined in claim 1 including means for enabling said detector to sense the stopping of said needle in any one of a plurality of predetermined positions, and manually operable means for selecting any one of such positions and conditioning said detector to control said mechanism and advance the needle to the position so selected.

References Cited by the Examiner
UNITED STATES PATENTS

| | | | |
|---|---|---|---|
| 2,788,104 | 4/1957 | Mason | 192—84 |
| 2,920,221 | 1/1960 | Schwab | 112—219 X |
| 2,961,591 | 11/1960 | Frankel et al. | 112—219 X |
| 3,160,128 | 12/1964 | Heidt | 112—219 |

FRANK J. COHEN, *Primary Examiner.*

ROBERT V. SLOAN, *Assistant Examiner.*